Jan. 17, 1933.  E. J. GALLAGHER, JR  1,894,861
WINDSHIELD HEATER
Filed Dec. 21, 1931
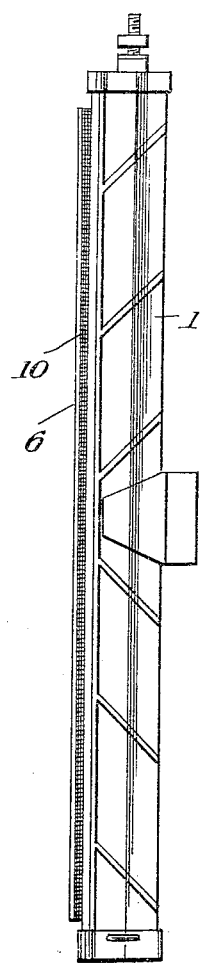
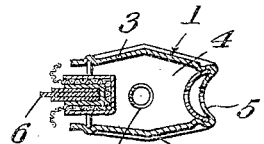
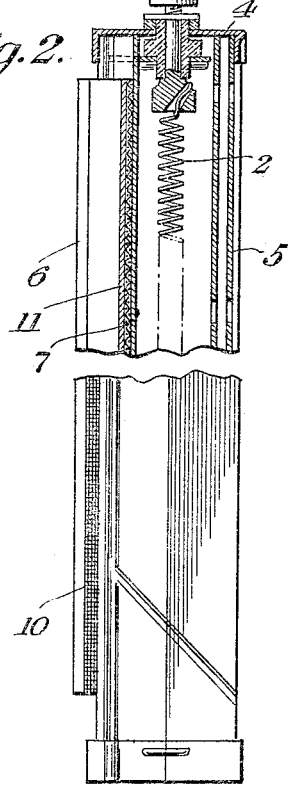
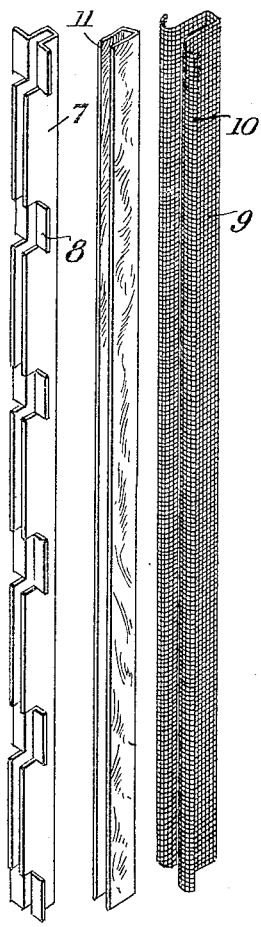
Edward J. Gallagher Jr.
INVENTOR
BY Victor J. Evans & Co.
ATTORNEYS Patented Jan. 17, 1933

1,894,861

UNITED STATES PATENT OFFICE

EDWARD J. GALLAGHER, JR., OF BALTIMORE, MARYLAND

WINDSHIELD HEATER

Application filed December 21, 1931. Serial No. 582,432.

This invention relates to windshield wiper elements of the character set forth in my United States Letters Patent #1,798,018 and has for the primary object, the provision of an improved means for conducting heat directly to the transparent member so that the latter will be efficiently heated to prevent moisture and the like from freezing thereon and which is so constructed as not to interfere with the circulation of heated air against the transparent member and further will not pocket or catch foreign matter during its movements relative to the transparent member.

Another object of this invention is the provision of means for protecting the usual wiping strip from heat and thereby obviating destruction or rapid deterioration thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a windshield wiping element constructed in accordance with my invention.

Figure 2 is an enlarged side elevation partly in section illustrating the same.

Figure 3 is a transverse sectional view illustrating means for directing heated air and also heat directly to a transparent member or panel.

Figure 4 is a perspective view illustrating a holder.

Figure 5 is a similar view illustrating a heat insulating element.

Figure 6 is a similar view illustrating a heat conductive element.

Referring in detail to the drawing, the numeral 1 indicates a casing of a windshield wiper element in which is located an electrical heating medium 2. The casing includes side walls 3, end walls 4 and a rear wall 5 provided with a series of apertures to permit circulation of air through the casing and about the heating medium 2. The casing 1 has its front substantially fully opened for the reception of a wiper strip 6 of a conventional type. A holder 7 is mounted between the side walls of the casing for supporting the wiper strip and is of substantially U-shape in cross section and provided with relatively spaced and angularly disposed tongues 8 adapted to seat within grooves formed within the side walls 3 of the casing. The tongues 8 support the holder in spaced relation to the walls of the casing so that the heated air may pass about the same for contact with a transparent panel or member.

A heat conducting element 9 constructed of metallic mesh or the like is located within and against the inner walls of the holder 7 and is of substantially U-shape in cross section with the free edges thereof extending outwardly of the holder on opposite sides of the wiping strip 6 and are rounded or curved as shown at 10 to bear lightly against the transparent member or panel. The heat conducting element 9 is adapted to absorb heat from the holder 7 and apply the heat directly to the transparent panel or member. The free edges of the element 9 being rolled and of a perforated nature will permit foreign matter to readily pass therethrough and thus prevent pocketing or catching of foreign matter during the movement of the wiper over the transparent panel or member.

A heat insulating element 11 of substantially U-shape in cross section is placed within the holder 7 between the heat conducting element 9 and the wiper strip 6 to protect the latter from excessive heat and thereby prevent deterioration or destruction thereof.

From the foregoing description taken in connection with the accompanying drawings it will be seen that the heated air from the casing may pass onto the transparent panel or member being wiped about the edges 10 and through said edges 10 of the heat conducting element 9. The heated air playing against the holder 7 will heat the same to a high degree of temperature and the heat is transmitted directly to the heat conducting element 9 and thence to the transparent panel or member due to the rolled or curved edges 10 contacting directly with the transparent panel or member.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A windshield wiper element comprising a casing, a heating medium for said casing, a holder in the casing and spaced from the walls thereof, a wiper strip carried by the holder, a perforated heat conducting element carried by the holder and adapted to absorb heat and transmit the same directly to a transparent panel by contacting therewith at opposite sides of the wiping strip.

2. A windshield wiper element comprising a casing, a heating medium for said casing, a holder in the casing and spaced from the walls thereof, a wiper strip carried by the holder, a heat conducting element of foraminous material carried by the holder and having the edges thereof projecting laterally of the sides of the holder and the wiping strip to absorb heat and transmit the same directly to a transparent panel by contacting therewith.

In testimony whereof I affix my signature.

EDWARD J. GALLAGHER, Jr.